United States Patent [19]
Lugowski et al.

[11] Patent Number: 5,656,169
[45] Date of Patent: Aug. 12, 1997

[54] BIODEGRADATION PROCESS FOR DE-TOXIFYING LIQUID STREAMS

[75] Inventors: Andrew Jerry Lugowski, Toronto; Garry Allen Palmateer, London; Timothy Richard Boose, Elmira; Jeffrey Edward Merriman, Kitchener, all of Canada

[73] Assignee: Uniroyal Chemical Ltd./Ltee, Elmira, Canada

[21] Appl. No.: 693,692

[22] Filed: Aug. 6, 1996

[51] Int. Cl.$^6$ .................................................. C02F 3/34
[52] U.S. Cl. .......................... 210/611; 210/908; 210/909; 435/262.5; 435/874
[58] Field of Search .................................. 210/601, 610, 210/611, 612, 613, 908, 909; 435/262.5, 874, 875, 876, 829

[56] References Cited

U.S. PATENT DOCUMENTS

| | | | |
|---|---|---|---|
| 3,462,275 | 8/1969 | Bellamy | 99/9 |
| 3,838,198 | 9/1974 | Bellamy et al. | 426/53 |
| 4,046,678 | 9/1977 | Zajic et al. | 210/611 |
| 4,129,483 | 12/1978 | Bochner | 195/100 |
| 4,415,658 | 11/1983 | Cook et al. | 210/611 |
| 4,765,901 | 8/1988 | Field | 210/603 |
| 4,804,629 | 2/1989 | Roy | 435/874 |
| 4,806,482 | 2/1989 | Horowitz | 435/262 |
| 4,833,086 | 5/1989 | Horowitz | 435/252.1 |
| 4,853,334 | 8/1989 | Vandenbergh et al. | 210/601 |
| 4,859,594 | 8/1989 | Portier | 210/601 |
| 4,876,201 | 10/1989 | Bedard et al. | 210/601 |
| 5,516,688 | 5/1996 | Rothmel | 435/262.5 |

FOREIGN PATENT DOCUMENTS

| | | |
|---|---|---|
| 46601 | 2/1986 | Canada . |
| 1285510 | 7/1991 | Canada . |
| 1295270 | 2/1992 | Canada . |
| 1306433 | 8/1992 | Canada . |
| 1309366 | 10/1992 | Canada . |
| 2-194894 | 8/1990 | Japan . |
| 3-181395 | 8/1991 | Japan . |

OTHER PUBLICATIONS

Biological Treatment of Phenols and Nitrogen–Containing Aromatic Bases from Industrial Waste Water Effluents, Hüppe et al., Dechema Biotech. Confs. 3 – Verlagsgesellschaft, pp. 929–932.

Evaluation of Bioremediation in a Coal–Coking Waste Lagoon, Leavitt et al., Environmental Biotechnology for Waste Treatment, pp. 71–84.

Immobilized Microbe Bioreactors for Waste Water Treatment, Portier et al., pp. 445–451.

Powdered Activated Carbon Combined with Biological Treatment to Remove Organic Matter Containing Cresols and Xylenols, Galil et al., pp. 199–218.

(List continued on next page.)

*Primary Examiner*—Thomas G. Wyse
*Attorney, Agent, or Firm*—Raymond D. Thompson

[57] ABSTRACT

A biological degradation process is disclosed. The biological gradation process utilizes a unique thermophilic aerobic bacterial mixture capable of converting, biologically or via oxidation, aqueous and other liquid streams containing substances that are ordinarily considered toxic to conventional biological systems. Substances ordinarily considered toxic to conventional biological systems, but which nevertheless are converted by the thermophilic aerobic bacterial mixture, include aniline; benzothiazole; 5,6-dihydro-2-methyl-N-phenyl-1,4-oxathiin-3-carboxamide; lindane (technically known as $1\alpha,2\alpha,3\beta,4\alpha,5\alpha,6\beta$-hexachlorocyclohexane); 2-mercaptobenzothiazole; toluene; and combinations thereof. The unique thermophilic aerobic bacterial mixture comprises relative effective amounts of *Pseudomonas stutzeri, Pseudomonas aeruginosa, Pseudomonas fluorescens, Pseudomonas mendocina* and *Alcaligenes denitrificans subsp. xylosoxydans*. A biological degradation process for treating the liquid stream containing substances ordinarily considered toxic comprises contacting the stream with the thermophilic aerobic bacterial mixture, for an amount of time that is effective for de-toxifying the stream.

7 Claims, 1 Drawing Sheet

OTHER PUBLICATIONS

Chemostat Studies of a Mixed Culture Growing on Phenolics, Hobson et al., pp. 684–691.

Inhibition by Hazardous Compounds in an Integrated Oil Refinery, Rebhun et al., pp. 1953–1959.

Disturbances and Inhibition in Biological Treatment of Wastewater from an Integrated Refinery, Galil et al., pp. 21–29.

Industrial Wastes – D. Coke, Foundry, and Steel Mill Wastes, Sutton et al., pp. 751–758.

Aerobic Biological Treatment, Eckenfelder, pp. 125–145.

Industrial Wastes – A. Petroleum Wastes, Douglas et al., pp. 623–629.

BIOLOG Bacteria Identification Procedure (2 Pages).

Comparison Between Thermophilic and Mesophilic Aerobic Biological Waste (1–Page Abstract).

Thermophilic Mixed Culture of Bacteria Utilizing Methanol for Growth, Snedecor et al., pp. 1112–1117.

Thermophilic Aerobic Treatment of High Strength Ground Water: Pilot Plant Results and Concept Design, Rozich et al., pp. 153–163.

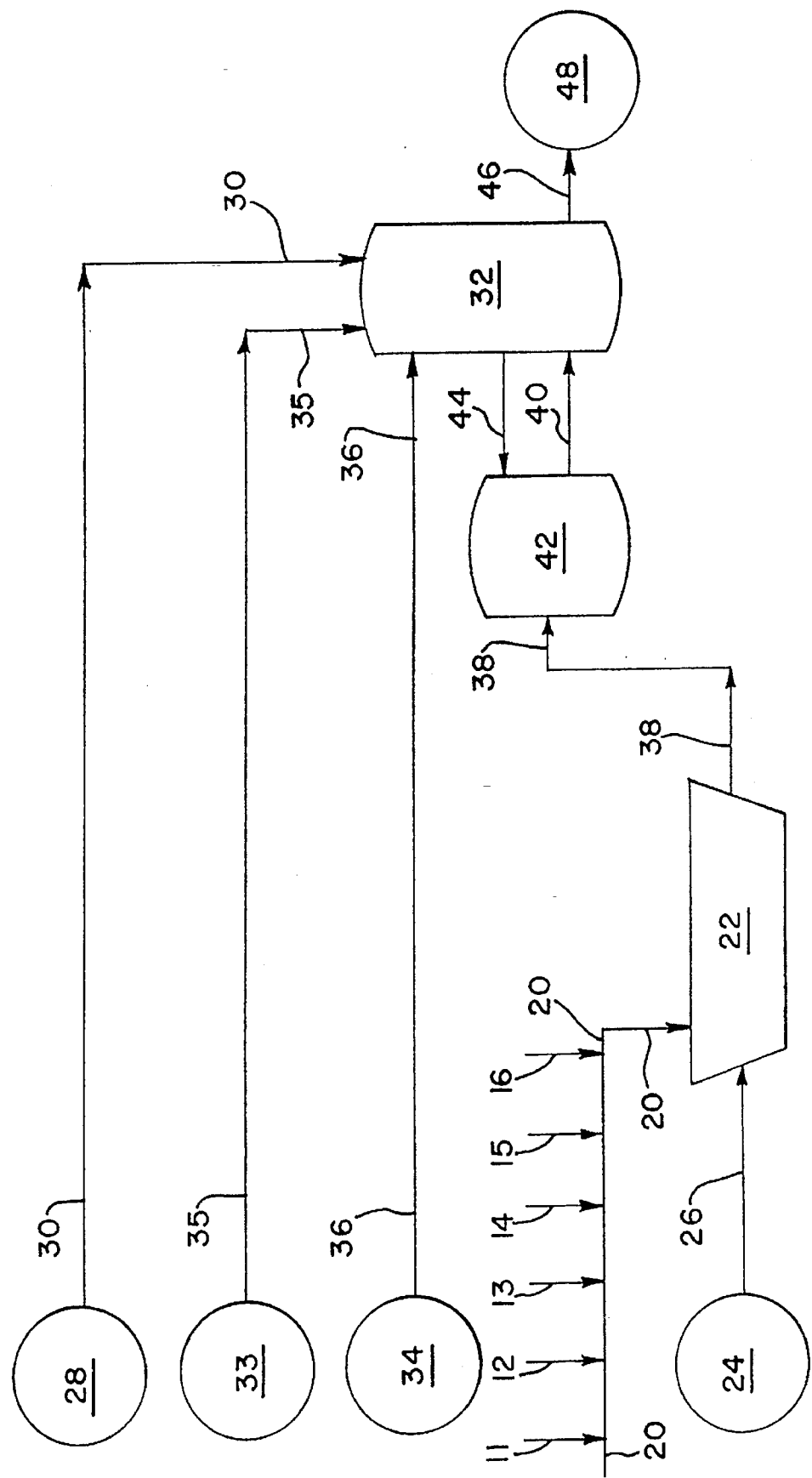

BIODEGRADATION PROCESS FOR DE-TOXIFYING LIQUID STREAMS

TECHNICAL FIELD OF THE INVENTION

Our invention, in general, is directed to a biological degradation process, which treats aqueous and other liquid streams containing various substances ordinarily considered toxic, and which de-toxifies these streams. (As it is used throughout this specification, the term "biological degradation" shall be understood to include—but not be limited to—biochemical reaction or oxidation, for purposes of chemically converting a specified substance.)

More particularly, we have discovered a novel biologically-oriented chemical-degradation process that utilizes a unique thermophilic aerobic bacterial mixture. The aerobic bacterial mixture of our discovery not only is able to de-toxify aqueous and other liquid streams but also is effective for treating compositional make-ups that may vary considerably over time.

BACKGROUND OF THE INVENTION

Processes which use select microorganisms to treat solid, organic, biodegradable waste materials have long been known.

For example, U.S. Pat. No. 3,462,275 to Bellamy discloses a process for biodegrading such organic waste materials as sewage sludge, slaughterhouse effluent and dairy wastes; and U.S. Pat. No. 3,838,198 to Bellamy et al. discloses a process for biodegrading such organic materials as excrement from ruminents.

A thermophilic mixed culture of bacteria which uses methanol for growth was reported by B. Snedecor and C. L. Cooney in the June 1974 issue of Applied Microbiology at pages 1112–1117.

Canadian Patent No. 1,285,510 to Dyadechko et al. discloses a process for using a bacterial composition to recover environmentally-acceptable water and soil from oil-polluted water and soil.

Canadian Patent No. 1,306,433 to Polne-Fuller discloses a process for microbially degrading certain halogenated hydrocarbons.

U.S. Pat. Nos. 4,806,482 and 4,833,086—both to Horowitz—each disclose a novel plasmid and its use in a microbial host, to degrade ethylene dichloride and certain other chloro-aliphatic organic compounds.

Conventional technologies presently used to treat aqueous and other liquid streams include incineration, evaporation, carbon adsorption, advanced and wet-air oxidation, and biological-activated sludge.

Using naturally-occurring microbes and microbial processes to convert ordinarily toxic manufacturing facility by-products and other substances, borne by aqueous streams, to environmentally-safe materials at environmentally-acceptable levels is desirable for a number of reasons.

For example, it is currently of interest to protect our environment, while reducing capital investment and other operating costs associated with doing so. It is also currently of interest to use naturally-occurring microorganisms to provide a cleaner, safer environment.

However, prior to our discovery, the use of biological methods to convert or otherwise "process" certain recalcitrant products as well as manufacturing-facility by-products to environmentally-safe products (and other materials) at environmentally-acceptable levels were, in general, either not known or not economically feasible. (In the biological sense, the term "recalcitrant" is understood to mean resistant to oxidation.)

Furthermore, the biodegradability of an assortment of typical manufacturing-facility by-products is known to vary.

For example, aniline is known to be biodegradable to some extent; and carboxin has been reported to be biodegradable in certain select, ideal environments; but benzothiazole, on the other hand, is presently known as a recalcitrant substance. While, lindane, once also thought to be recalcitrant, has recently been reported as being biodegradable under certain conditions; yet any biodegradability of 2-mercaptobenzothiazole still remains unreported.

Thus, the desire to use microbial processes to treat aqueous and other liquid streams, initially ordinarily considered toxic, for purposes of producing environmentally-neutral aqueous and other liquid streams at environmentally-safe as well as environmentally-acceptable compositional levels, has been and continues to be an ongoing quest.

SUMMARY OF THE INVENTION

We are accordingly pleased to report that we have discovered a novel biological degradation process which achieves these desiderata.

Our novel biological degradation process utilizes a unique thermophilic aerobic bacterial mixture capable of converting—biologically or via oxidation—aqueous and other liquid streams containing a vast assortment of substances that are initially ordinarily considered toxic to conventional biological systems. As a result, our biological degradation process, while generating minimal quantities of sludge, produces aqueous and other liquid streams which are environmentally safe and otherwise environmentally acceptable.

In particular, the novel thermophilic aerobic bacterial mixture is capable of de-toxifying numerous substances initially ordinarily considered toxic such as manufacturing-facility products as well as their by-products.

Examples of substances ordinarily considered toxic include aniline; benzothiazole; carboxin (technically known as 5,6-dihydro-2-methyl-N-phenyl-1,4-oxathiin-3-carboxamide); lindane (technically known as $1\alpha,2\alpha,3\beta,4\alpha,5\alpha,6\beta$-hexachlorocyclohexane); 2-mercaptobenzothiazole; toluene; and various mixtures of these.

Indeed, various aqueous and other liquid streams containing substances initially ordinarily considered toxic are readily converted by the thermophilic aerobic bacterial mixture of our discovery into non-toxic liquid streams.

Briefly, we have discovered a unique thermophilic aerobic bacterial mixture as well as a novel biological degradation process, capable of biologically treating an assortment of liquid streams containing various substances initially ordinarily considered toxic, and able to de-toxify these streams.

More particularly, we have discovered a novel biologically-oriented chemical-degradation process that utilizes the unique thermophilic aerobic bacterial mixture described herein.

The thermophilic aerobic bacterial mixture of our discovery is not only able to render the herein-mentioned liquid streams environmentally-acceptable but also is effective over a wide range of stream compositions initially ordinarily considered toxic. Furthermore, any such liquid stream may vary considerably over time with respect to concentration of any composition ordinarily considered toxic.

Thus, liquid streams containing such initially ordinarily considered toxic compounds as aniline, benzothiazole, carboxin, lindane, 2-mercaptobenzothiazole, and toluene—all contained together—are simultaneously readily biologically converted to environmentally-safe products and other materials at environmentally-acceptable levels upon being treated with our unique thermophilic aerobic bacterial mixture. In other words, all of these compounds initially ordinarily considered toxic, or some, or only one such compound initially ordinarily considered toxic, may be present; and, in all cases, the below-identified unique thermophilic bacterial mixture has demonstrated its effectiveness with respect to the de-toxification of such a substrate.

Such a thermophilic aerobic bacterial mixture comprises relative effective amounts of Pseudornonas stutzeri, Pseudornonas aeruginosa, Pseudomonas fluorescens, Pseudomonas rnendocina and Alcaligenes denitrificans subspecies (subsp.) xylosoxydans.

This particular combination of strains is unique because, together, they have the ability to bio-degrade not only the above-mentioned mixture of compounds ordinarily considered toxic, but also a wide assortment of other stream compositions ordinarily considered toxic,

BRIEF DESCRIPTION OF THE FIGURE

The accompanying FIGURE is a process flow diagram ("PFD") illustrating an apparatus (also herein referred to as a system) embodying certain principles of the process of our present invention.

DETAILED DESCRIPTION OF PREFERRED EMBODIMENT

The following preferred embodiment is set forth to describe more particularly, to those skilled in this art, the principles and practice of our present invention.

However, our preferred embodiment is not intended to limit our invention. That is because various alternatives, changes and modifications will readily become apparent to those skilled in this art upon reading our detailed specification.

It is accordingly our intent that such alternatives, changes and modifications, as will become apparent to those skilled in the art, are to be considered as forming a part of our present invention insofar as they fall within the spirit and scope of the claims.

DETAILED DESCRIPTION OF FIGURE

The contents of several aqueous and other liquid streams 11, 12, 13, 14, 15 and 16 merge and in conduit 20 are together passed via the conduit 20 to a neutralization basin 22. Each of the liquid streams 11, 12, 13, 14, 15 and 16 typically contains a number of compounds or other substances initially ordinarily considered toxic.

The pH of the neutralization basin 22 is maintained at 7.3±0.5 by conventional means, utilizing neutralization chemicals, which are passed from a "neutralization chemicals" source 24 via a conduit 26 to the neutralization basin 22, as needed, for pH control.

Each of the aqueous and other liquid streams 11, 12, 13, 14, 15 and 16 is typically dilute, and the relative concentration of any particular manufacturing product or by-product in any such aqueous or other liquid stream 11, 12, 13, 14, 15 or 16 can vary considerably over time, as can the overall flow of any such liquid stream 11, 12, 13, 14, 15 or 16.

Neutralized carboxin manufacturing-facility products as well as carboxin manufacturing-facility by-products, from source 28, are passed via a conduit 30 to an aeration tank 32.

The aeration tank 32 contains our unique thermophilic aerobic bacterial mixture mentioned above.

Nutrients from a "nutrients" source 33 are passed via a conduit 35 to the aeration tank 32, as needed. Nutrients thus utilized include nitrogen-based nutrients as well as phosporus-based nutrients.

A "classical" biological system would require approximately one-hundred (100) parts-by-weight ("parts") carbon, approximately five (5) parts nitrogen, and one (1) part phosphorus. In sharp contrast, our particular biological system, because of the unique thermophilic aerobic bacterial mixture that is utilized, requires approximately 100 parts carbon, approximately 3 parts nitrogen, and 0.3 parts phosphorus.

Air or oxygen from another source 34 is passed via a separate conduit 36 to the aeration tank 32, and dispersed through the aeration system, which is characterized by high oxygen transfer (>20%).

The contents of the neutralization basin 22 are passed via a conduit 38 into a surge tank 42. The contents of surge tank 42 are passed into aeration tank 32 via a conduit 40.

The unique thermophilic aerobic bacterial mixture contained within aeration tank 32 de-toxifies and biodegrades the contents of the streams supplied by conduits 30 and 40.

A portion (a minor portion) of the effluent from the aeration tank 32 is recycled and passed via a conduit 44 back into surge tank 42.

Within the surge tank 42, the recycled aeration tank effluent is combined with those contents of the neutralization basin 22 which are being introduced into the surge tank 42 via conduit 38; and the resultant mixture is passed via conduit 40 back into the aeration tank 32.

The remainder (a major portion) of the effluent from the aeration tank 32 is passed via a conduit 46 to a post-treatment site 48, which includes additional pre-treatment process steps, and solids-removal equipment to remove a portion of the total suspended solids, before being passed to a municipal sewage treatment works (not shown).

In operation, the process presented in the accompanying FIGURE receives—via conduits 11, 12, 13, 14, 15, 16 and 30—several aqueous and other ordinarily liquid streams, characterized by high organic loading and containing initially ordinarily toxic substances, and produces a de-toxified liquid steam of low organic loading, which is passed via conduit 46 to the post-treatment site 48.

Nutrients are supplied to the process via conduit 35; air or oxygen is supplied to the process via conduit 36; and neutralization chemicals are supplied to the process via conduit 26.

Additional complementary water-treatment processing equipment for further treatment downstream (if desired) may include secondary biological treatment, dissolved air flotation equipment, activated carbon adsorption equipment, and/or enhanced ultraviolet ("UV") oxidation equipment. It should be understood, however, that the process of this invention (the main treatment process) removes the majority of organics as well as de-toxifies; and, that all of this is accomplished by the aerobic thermophilic bacterial process, comprising the five (5) groups or strains of bacteria, as described previously.

Terms And Definitions

In the following detailed description, certain terms and definitions will be utilized for purposes of conciseness and otherwise to elucidate the various aspects, features and advantages of our present invention.

The term "aerobic culture" refers to a culture produced by the incubation of an inoculated medium in the presence of air.

The term "axenic" refers to the condition in which only one type (i.e. species or strain) of organism—e.g. a pure culture—is present.

The term "bacterial colony" on or within a solid medium, such as an agar plate, shall be understood to commonly consist of a compact mass of individual cells which have usually resulted from multiplication of a single cell at that location.

The term "biomass" is understood to mean the dry-weight, volume (or other quantitative estimation) of organisms (commonly microorganisms—sometimes specifically photosynthetic microorganisms) which are in a body of water (e.g. a lake) or in a synthetic medium. The term "biomass" as used herein also connotes, in a much broader sense, the sum total of all living organisms that are in an ecosystem.

The term "biotype," in the microbiological sense, shall herein be understood to connote a variant form of a given species—or serotype—distinguishable by biochemical (i.e. metabolic) or other means.

The term "BOD" shall be understood to mean biochemical oxygen demand, which is a standardized means of estimating the degree of contamination of water supplies, especially those which receive contamination from sewage and industrial wastes. BOD is expressed as the quantity of dissolved oxygen (in mg/liter) required during stabilization of decomposable organic matter by aerobic biochemical action. The determination of BOD is accomplished by diluting suitable portions of a sample with water saturated with oxygen and determining the amount of dissolved oxygen in the mixture both immediately and after a period of incubation.

The term "$BOD_5$" shall be understood to mean biochemical oxygen demand determined after a 5-day incubation period.

The term "broth culture" refers to a culture produced either in nutrient broth or in a similar liquid medium.

The term "COD" shall be understood to mean chemical oxygen demand, which is a measurement of the amount or quantity of oxidizable components present in water. The COD valuation measurement is based upon the premise that carbon and hydrogen—but not nitrogen—in organic matter are oxidized by chemical oxidants. The evaluation of oxygen consumed is dependent upon the oxidant, the structure of the organic compound and the manipulative procedure, and thus becomes a measurement only of the chemically oxidizable components. Because the chemical oxygen demand valuation procedure does not differentiate stable from unstable organic matter, the COD value does not necessarily correlate with the biochemical oxygen demand value.

The term "colony" shall herein be understood to connote a number of individual cells or organisms of a given species which, collectively, during their development, have formed a discrete aggregate or group.

The term "co-metabolism" shall be understood to mean an enzymatic transformation which results in no direct benefit to the transforming microorganism in terms of energy, carbon or other nutrient. In a complex microbial community, however, co-metabolism may benefit other members of the community and indirectly, through sharing of metabolic products, often also the co-metabolizing microorganism.

The term "culture" shall herein connote a growth of a particular type (or particular types) of microorganism on or within a solid medium, or in a liquid medium, formed as a result of the prior inoculation and incubation of such medium. Growth on a solid medium, for example, may be present as a continuous layer or film (called "confluent growth") or as discrete (e.g. individual) colonies—depending upon the method of inoculation.

The term "de-toxify" shall be understood to mean the ability to convert—via chemical reaction or otherwise—a toxic substance into a composition-of-matter which is not a toxic substance.

The term "DO" shall be understood to mean dissolved oxygen, which is one of the most important indicators of the condition of a water supply for biological, chemical and/or sanitary purposes. For example, a particular quantity of dissolved oxygen may be necessary for maintaining life of fish as well as other aquatic organisms, or may be an indicator of photosynthetic activity, septicity, and so forth.

The term "DOC" shall be understood to mean dissolved organic carbon, which is the fraction of "TOC" that passes through a 0.45 μm (pore-diameter) filter.

The term "ecosystem" shall be understood to mean a functional system which includes the organisms of a natural community together with their environment.

The "Kjeldahl test" is an analytical method for determination of nitrogen in certain organic compounds. Determination of nitrogen via the Kjeldahl test involves addition of a small amount of anhydrous potassium sulfate to the test compound, followed by heating the mixture with concentrated sulfuric acid, often with a catalyst such as copper sulfate, resulting in the formation of ammonia. After alkalyzing the resulting mixture with sodium hydroxide, the ammonia is separated by distillation, collected in standard acid, and the nitrogen determined by back-titration.

The term "medium" shall be understood, in general, to connote any material which supports the growth or replication of microorganisms. In a defined medium all of the constituents, including trace substances, are quantitatively known. Liquid culture media for bacteria are often prepared from basal media such as nutrient broth or peptone water.

The term "NDMA" means N-nitrosodimethylamine.

The term "pure culture" shall be understood to mean a culture comprising organisms which are all of the same species or strain.

The term "serotype" shall be understood to mean one of a number of antigenically-distinguishable members of a single bacterial species. In their serological sense, bacterial strains may exhibit differences which are not apparent from the results of biochemical (i.e. metabolic) tests.

The term "species" shall herein be understood to mean one of the smallest (i.e. least inclusive) of taxonomic groupings. In this sense, a species is a category of individuals which displays a high degree of mutual similarity—the characteristics which circumscribe the category being defined by a consensus of informed opinion. Species differentiation in many microorganisms (e.g. the fungi) is frequently based on morphological or other differences. In bacteria, small differences in metabolic characteristics may be regarded as sufficient grounds for the creation of separate species names. Organisms within a given species may exhibit character variation due to the effects of mutation, plasmid transfer, and/or recombination.

The term "strain" connotes a cell, or population of cells, which has the general characteristics of a given type of organism (e.g. bacterium or fungus) or of a particular (i.e. named) genus, species, or serotype. The term "strain" may also be used to refer to a cell, or population of cells, which exhibits a particular, i.e. named characteristic.

The term "streaking" shall be understood to mean a method of inoculation of the surface of a solid medium such that, during subsequent incubation, individual bacterial colonies (rather than confluent growth) develop on (at least) part of the medium.

The term "TDS" shall be understood to mean total dissolved solids.

The term "TKN" shall be understood to mean total Kjeldahl nitrogen, wherein the total Kjeldahl nitrogen value is determined by means of the Kjeldahl test.

The term "TOC" shall be understood to mean total organic carbon, which is a more convenient and direct expression of total organic content than either BOD or COD. The TOC value is independent of the oxidation state of the organic matter, and does not measure other organically-bound elements, such as nitrogen, hydrogen and inorganics which can contribute to the oxygen demand value measured by BOD or COD.

The term "toxic" as used herein shall connote a substance or material which is affected by, or caused by, a toxin.

The term "toxicity" shall be understood to mean the ability of a substance to cause damage to living tissue, impairment of the central nervous system, severe illness or, in extreme cases, death when ingested, inhaled, or absorbed by the skin. Amounts required to produce such results will vary with the nature of the substance and time of exposure. Toxicity is objectively evaluated on the basis of test dosages made on experimental animals under controlled conditions. Illustrative are the $LD_{50}$ (i.e. lethal dose, 50%) test and the $LC_{50}$ (i.e. lethal concentration, 50%) test, both of which include exposure of a test animal to oral ingestion, extended skin contact, and inhalation of the material under test.

The term "toxic substance" shall be interpreted in light of the Toxic Substances Control Act of 1976 et seq. ("TOSCA"), as implemented by the Environmental Protection Agency ("EPA"), an agency of the federal government of the United States of America.

The term "TSS" shall be understood to mean total suspended solids.

The term "VSS" shall be understood to mean volatile suspended solids.

Process Microbiology

Samples taken from aeration tank 32 during start-up of the aerobic thermophilic process were obtained and the findings noted.

Samples were obtained and observations made, for purposes of recording morphology and noticeable changes of bacterial populations. The changes in the bacterial concentration in aeration tank 32 became evident as the bacteria, introduced into aeration tank 32, became acclimated to the system.

Micronutrients

A suitable level of micronutrients in a bacteriological treatment system is a factor which affects the efficiency of treatment. To study the effects of micronutrients on the treatment of the types of toxic liquid streams typical of the process disclosed herein, certain nutrients were added to bench-scale bioreactors (discussed further hereinbelow), in an attempt to optimize treatment.

First Step In Assessing Efficiency

The first step in assessing the efficiency of treatment was to determine the respective levels of macronutrients (i.e., carbon, nitrogen and phosphorus) and micronutrients (i.e., select elements or "minerals") available for bacteriological growth and enzymatic activity.

A particular carbon-to-nitrogen-to-phosphorus ratio under investigation was deemed satisfactory after reviewing current available data (respectively: biological oxygen demand, ammonia, and soluble phosphorus) at the beginning of the study. A ratio value of 100:20:0.5, based upon the respective weights of carbon-to-nitrogen-to-phosphorus, was found to be well within an optimal operating ratio.

In contrast, the determination of the micronutrients, which form key components of the enzymes involved in the biological oxidation of organic chemicals, were found to be too low initially, with respect to certain specific elements, as is shown in Table I.

TABLE I

Nutrient Characterization

| Element or Mineral | Bioreactor 1 (milligram/liter) | Bioreactor 2 (milligram/liter) | Optimum Level (milligram/liter) |
|---|---|---|---|
| Manganese | 0.5 | 0.61 | 5.0 |
| Zinc | 3.9 | 3.2 | 5.0 |
| Molybdenum | 0.07 | 0.09 | 2.0 |
| Copper | 6.8 | 15.3 | 0.4 |
| Vanadium | 0.01 | 0.008 | 0.2 |
| Boron | 0.7 | 0.79 | 0.1 |
| Chromium | 0.14 | 0.23 | 0.1 |
| Cobalt | 0.02 | 0.008 | 0.1 |
| Nickel | 0.24 | 0.21 | 0.1 |

In particular, cobalt, manganese, molybdenum and vanadium concentration levels were found to be very low in the aeration tank and the bench-scale bioreactors (mentioned above and discussed further below). Respective concentrations of these various elements were adjusted to suitable concentration levels. In this regard, concentration levels were altered; and resultant changes in bacterial levels as well as predominating types, including oxygen uptake rates, were investigated.

It was apparent, from observations made at the time of the investigation, that the system was operating more effectively as time passed, based on an increase in the average oxygen uptake rate of approximately seventeen (17) percent. Trace elements were accordingly added, as needed.

Respiration rates for a particular bioreactor were measured by turning off the aeration system and taking dissolved oxygen readings, each minute of a ten minute period. The resultant readings were plotted (with time being on the abscissa), and the value of the slope calculated. The calculated slope value represented the respiration rate of a particular bioreactor being investigated.

The average respiration rate of the above-noted bioreactor was 0.300 milligrams/liter/minute before the addition of trace elements. After addition of trace elements, the average respiration rate increased to 0.352 mg/L/min.

In the other of the two bench-scale bioreactors, before addition of trace elements, the average respiration rate was 0.287 mg/L/min. After addition of trace elements, the resulting increase to 0.356 mg/L/min. indicated a significant increase in biological activity, which was reflected in the resulting rate of biological treatment. Respiration rates thus were observed to increase appreciably, following the adjustment of select trace elements to suitable concentration levels.

Second Step In Assessing Efficiency

Certain vitamins are also needed by bacteria for metabolic purposes. For example, folic acid is one of the "B" vitamins which is known to affect the metabolic activity of bacteria. To this end, the addition of folic acid was also considered for the optimization of biological activity in the bench-scale bioreactors (described below).

The second step in assessing the efficiencies of the bench-scale bioreactors was the addition of folic acid to one of the bench-scale bioreactors. A solution was prepared with a sufficient amount of folic acid present to produce a concentration of $3\times10^{-6}$ mg/L in the bioreactor when 1 mL of the solution was added to the bioreactor. The addition of folic acid to the bioreactor caused a slight increase in the average respiration rate from 0.352 to 0.358 mg/L/min.

For purposes of investigating optimal activity of the microbial population, conventional bench-scale bioreactors (not shown) were employed as "control" units, to determine the effects of purine and pyrimidine addition on the efficiency of the bacterial mixture used to treat manufacturing facility products and by-products sent to aeration tank 32.

Purines and pyrimidines are typically used in the biosynthesis of such proteins as bacterial enzymes. Enzymes are necessary for the bacterial degradation of chemical compounds. A shortage of purines and pyrimidines may reduce enzymatic activity and thus limit the bacterium in its desired ability to biodegrade chemical compounds.

Accordingly, solutions of the well-known DNA/RNA purines: adenine (A) and guamine (G) as well as the well-known DNA/RNA pyrimidines: cytosine (C), thymine (T) and uracil (U), were prepared and added to one of the bench-scale reactors, to determine if their effect would enhance the efficiency of biodegradation of certain chemical compounds known to be present in the aeration tank 32. In particular, a daily dosage of 10 milligrams ("mg") of each purine and pyrimidine was added to one of the bench-scale reactors, while the other bench-scale reactor was used as a "control."

Oxygen uptake, DOC reduction and lindane reduction were used as indicators of biological activity, to determine if any changes in treatment efficiency occurred as a result of purine and pyrimidine addition.

The result of our study indicates that the addition of the purines and pyrimidines, identified above, at a daily dosage of 10 mg did not statistically significantly increase the treatment efficiency.

Identification And Isolation Procedures

Samples were taken from the aeration tank 32 and the bench-scale bioreactors for bacteriological analyses. To characterize the bacterial population, the enumeration and isolation of bacteria from both the aeration tank 32 and bench-scale bioreactors was performed as follows.

A "wet mount" of a sample was prepared by transferring a single drop of the sample onto a microscope slide and placing a cover slip on the sample droplet. The wet mount was then microscopically examined and either videotaped or photographed, to record the morphology of the bacterial population in the samples and to observe any noticeable changes in the population, using a Nikon Optiphot-2 Phase contrast microscope with an attached Nikon FX 35WA 35 mm camera, Hitachi KP-C503G solid-state color camera, Panasonic PV-4201-K VHS video cassette recorder, and a JVC TM-13CA color monitor.

Dilutions of the samples were then prepared by using sterile pipettes to transfer sample aliquots into 90 milliliter ("mL") and 99 mL dilution blanks. Several appropriate dilutions were prepared and rotaplated onto specialized basal salts agar plates containing samples from aeration tank 32 as the sole carbon source.

The plates were then inverted and incubated at 41.5 degrees Celsius for 48 hours to 72 hours. Following incubation, the resulting bacterial colonies on each plate were counted; and the "counts" were then converted to bacterial concentrations (i.e., bacterial levels in the aeration tank 32 and bench-scale bioreactors) using the appropriate dilution factors.

Isolated colonies with different morphologies were picked and aseptically transferred to nutrient gelatin agar plates. These plates were incubated at 41.5° C. for 24 hours to 48 hours. The bacterial cultures were checked for purity. If mixed cultures were present, a single colony with the desired morphology was chosen and re-streaked to another nutrient gelatin plate and incubated, as described above.

Preliminary testing—performed after cultures were purified—included gram-staining; testing for catalase, testing for cytochrome oxidase, and testing for gelatinase; and then microscopically-examining a wet mount of the culture to double-check the culture purity and motility of the bacteria. To identify a particular bacterial strain, the culture was streaked heavily onto a suitable agar medium, to create a "lawn" of the bacterial culture. Care was taken, not to "dig into" the surface of the agar medium.

Gram negative isolates were grown on Tryptic Soy agar plates. (Isolates from the aeration tank 32 have all been characterized as gram negative.) The plates were incubated at 30° C. for 18 hours to 24 hours.

Before inoculating the Biolog System microplates, the microplates were brought to 30° to 35° C., to prevent thermal shock to bacterial cultures. Each culture was then suspended in a 25 to 30 mL 0.8% saline solution contained within a large screw-cap test tube (also brought to 30° to 35° C.). Suspension was achieved by pre-moistening a sterile cotton swab in saline solution and rolling the swab over the bacterial colonies, thereby transferring a portion of the bacterial colonies onto the cotton swab. Care was taken to avoid contacting growth medium, as any growth medium transferred with an isolate would cause erroneous results. Each tube was mixed gently, to provide a uniform suspension.

The Biolog System® turbidity meter was calibrated using a photometer tube filled with saline solution. The Biolog System turbidity meter was set at 100% transmittance with its photometer tube in place. A small portion of the bacterial suspension was then poured into a clean photometer tube and the turbidity of the suspension measured.

Gram-negative cultures gave a turbidity value in the range of 53 to 59% transmittance. (For a gram-negative culture, a turbidity value of 55 transmittance is deemed to be ideal.)

After adjusting and checking inoculum density, the cell suspension was poured into either a sterile pipette reservoir of the Biolog System or a sterile square petri dish. Eight sterile pipette tips were then attached to the repeating pipetter of the Biolog system. The pipette tips were filled with the suspension, and the pipetter primed.

Each of the 96 wells of a particular microplate was filled with 150 microliters ("µL") of liquid sample.

The microplates were incubated at 35° C. for 4 hours. The Biolog System computer program and automatic plate reader was then employed to take a 4-hour reading. Any isolates not identified were returned to the incubator to be incubated for an additional 20 minutes. A 24-hour reading was then taken to identify a particular organism, and the results printed out by the Biolog System printer.

Isolates of the Nocardia genus, a type of Actinomycete which cannot be identified using the Biolog System, were identified by its distinct morphological features.

In addition to the Biolog System, or in lieu of the Biolog System, reference is made to such a text as Bergey's Manual of Determinative Bacteriology, eight edition, co-edited by R. E. Buchanan & N. E. Gibbons, published (1974) by The Williams & Wilkins Company, for identification of microbiological organisms, such a text being well-known to those skilled in the art.

Enumerative Bacterial Analyses

To determine bacterial concentration in samples taken from aeration tank 32 as well as the bench-scale reactors, enumerative analyses were performed.

Appropriate dilutions of the samples were prepared and rotaplated on basal salts agar plates containing manufacturing facility products and by-products samples taken from aeration tank 32 as its sole carbon source. These plates were then incubated at 41.5° C. for several days. Following incubation, the bacterial colonies on the plates were counted. The counts were then converted to bacterial concentrations.

Biolog Bacterial Identification System

The Biolog Bacterial Identification System was used to identify bacteria isolated from the aeration tank 32 and the bench-scale reactors.

U.S. Pat. No. 4,129,483 to Bochner—entitled Device, Composition and Method for Identifying Microorganisms—discloses operation of the Biolog Bacterial Identification System. The Biolog System is available from Biolog, Inc., of Hayward, Calif.

Briefly, the Biolog System procedure is to (1) swab colonies from agar surface and suspend in normal saline; (2) adjust suspension density; (3) pipette suspension into (96-well) microplate and incubate for 4 hours or overnight; and (4) read results (visually or automatically) and identify the bacterium using the Biolog System data base software.

More particularly, the bacteria are isolated and identified, using detailed identification and isolation procedures set forth herein.

Readings were taken either after 4 hours or after 24 hours.

Following a reading taken after 4 hours or 24 hours, the Biolog System identified the bacteria as follows.

A Biolog System rectangular microplate was placed in the Biolog System reader; and a Biolog System operator (or technician) followed a series of "prompts," generated by the Biolog System computer program, to enter all information (e.g. sample number, source and growth agar used) requested by the Biolog computer program into the Biolog System.

Each Biolog System rectangular microplate uses redox chemistry, to perform carbon-utilization tests by responding to the process of metabolism (i.e. respiration), to thereby identify bacteria.

Each Biolog System rectangular microplate consists of 96 wells. Ninety-five (95) of the wells each contain a different carbon source; and the 96th well is a "control."

The Biolog System reader automatically scans each microplate to determine which of its 96 test wells displays a positive reaction and which displays a negative reaction.

Each Biolog System microplate is an 8-row (starting at "A" at the top and ending at "H" at the bottom) by 12-column (starting at "1" on the left and ending at "12" on the right) rectangular matrix of 96 wells.

A positive reaction (a purple color in any particular well) would indicate that the bacterial culture being tested is able to degrade the chemical contained in that well.

A negative reaction (no purple color in any particular well) would indicate that the bacterial culture being tested is unable to degrade the chemical contained in that well.

One such 96-well gram-negative microplate, suitable for purposes of the present invention and thus utilized, consisted of the following wells and contents:

In A1 was water; in A2 was α-cyclodextrin; in A3 was dextrin; in A4 was glycogen; in A5 was Tween 40; in A6 was Tween 80; in A7 was N-acetyl-D-galactosamine; in A8 was N-acetyl-D-glucosamine; in A9 was adonitol; in A10 was L-arabinose; in A11 was D-arabitol; and in A12 was cellobiose.

Tween 40 is the brand name for a liquid, nonionic polyoxyethylene sorbitan monopalmitate surfactant having an HLB value of 15.6 while Tween 80 is the brand name for a liquid, nonionic polyoxyethylene sorbitan monocleate surfactant having an HLB value of 15.0, both surfactants being available from ICI Surfactants of Wilmington, Del.

In B1 was i-erythritol; in B2 was D-fructose; in B3 was L-fucose; in B4 was D-galactose; in B5 was gentiobiose; in B6 was α-D-glucose; in B7 was m-inositol; in B8 was α-D-lactose; in B9 was lactulose; in B10 was realrose; in B11 was D-mannitol; and in B12 was D-mannose.

In C1 was D-melibiose; in C2 was β-methyl-D-glucoside; in C3 was D-psicose; in C4 was D-raffinose; in C5 was L-rhamnose; in C6 was D-sorbitol; in C7 was sucrose; in C8 was D-trehalose; in C9 was turanose; in C10 was xylitol; in C11 was methyl pyruvate; and in C12 was mono-methyl succinate.

In D1 was acetic acid; in D2 was cis-aconitic acid; in D3 was citric acid; in D4 was formic acid; in D5 was D-galactonic acid lactone; in D6 was D-galacturonic acid; in D7 was D-gluconic acid; in D8 was D-glucosaminic acid; in D9 was D-glucuronic acid; in D10 was α-hydroxybutyric acid; in D11 was β-hydroxybutyric acid; and in D12 was γ-hydroxybutyric acid.

In E1 was p-hydroxyphenylacetic acid; in E2 was itaconic acid; in E3 was α-keto butyric acid; in E4 was α-keto glutaric acid; in E5 was α-keto valeric acid; in E6 was D,L-lactic acid; in E7 was malonic acid; in E8 was propionic acid; in E9 was quinic acid; in E10 was D-saccharic acid; in E11 was sebacic acid; and in E12 was succinic acid.

In F1 was bromosuccinic acid; in F2 was succinamic acid; in F3 was glucuronamide; in F4 was alaninamide; in F5 was D-alanine; in F6 was L-alanine; in F7 was L-alanyl-glycine; in F8 was L-asparagine; in F9 was L-aspartic acid; in F10 was L-glutamic acid; in F-11 was glycyl-L-aspartic acid; and in F12 was glycyl-L-glutamic acid.

In G1 was L-histidine; in G2 was hydroxy L-proline; in G3 was L-leucine; in G4 was L-ornithine; in G5 was L-phenylalanine; in G6 was L-proline; in G7 was L-pyroglutamic acid; in G8 was D-serine; in G9 was L-serine; in G10 was L-threonine; in G11 was D,L-carnitine; and in G12 was γ-amino butyric acid.

In H1 was urocanic acid; in H2 was inosine; in H3 was uridine; in H4 was thymidine; in H5 was phenyl ethylamine; in H6 was putrescine; in H7 was 2-amino ethanol; in H8 was 2,3-butanediol; in H9 was glycerol; in H10 was D,L-α-glycerol phosphate; in H11 was glucose-1-phosphate; and in H12 was glucose-6-phosphate.

One such 96-well gram-positive microplate, also suitable for purposes of the present invention, but not utilized, if utilized would have consisted of the following wells and contents:

In A1 would have been water; in A2 would have been α-cyclodextrin; in A3 would have been β-cyclodextrin; in A4 would have been dextrin; in A5 would have been glycogen; in A6 would have been inulin; in A7 would have been mannan; in A8 would have been Tween 40; in A9 would have been Tween 80; in A10 would have been N-acetyl-D-glucosamine; in A11 would have been N-acetyl-D-mannosamine; and in A12 would have been amygdalin.

In B1 would have been L-arabinose; in B2 would have been D-arabitol; in B3 would have been arbutin; in B4 would have been cellobiose; in B5 would have been D-fructose; in B6 would have been L-fucose; in B7 would have been D-galaotose; in B8 would have been D-galacturonic acid; in B9 would have been gentiobiose; in B10 would have been D-gluconic acid; in B11 would have been α-D-glucose; and in B12 would have been m-inositol.

In C1 would have been α-D-lactose; in C2 would have been lactulose; in C3 would have been maltose; in C4 would have been maltotriose; in C5 would have been D-mannitol; in C6 would have been D-mannose; in C7 would have been D-melezitose; in C8 would have been D-melibiose; in C9 would have been α-methyl D-galactoside; in C10 would have been β-methyl D-galactoside; in C11 would have been 3-methyl glucose; and in C12 would have been α-methyl D-glucoside.

In D1 would have been β-methyl D-glucoside; in D2 would have been α-methyl D-mannoside; in D3 would have been palatinose; in D4 would have been D-psicose; in D5 would have been D-raffinose; in D6 would have been L-rhamnose; in D7 would have been D-ribose; in D8 would have been salicin; in D9 would have been sedoheptulosan; in D10 would have been D-sorbitol; in D11 would have been stachyose; and in would have been sucrose.

In E1 would have been D-tagatose; in E2 would have been D-trehalose; in E3 would have been turanose; in E4 would have been xylitol; in E5 would have been D-xylose; in E6 would have been acetic acid; in E7 would have been α-hydroxybutyric acid; in E8 would have been β-hydroxybutyric acid; in E9 would have been γ-hydroxybutyric acid; in E10 would have been p-hydroxyphenyl acetic acid; in E11 would have been α-keto glutaric acid; and in E12 would have been α-keto valeric acid.

In F1 would have been lactamide; in F2 would have been D-lactic acid methyl ester; in F3 would have been L-lactic acid; in F4 would have been D-malic acid; in F5 would have been L-malic acid; in F6 would have been methyl pyruvate; in F7 would have been mono-methyl succinate; in F8 would have been propionic acid; in F9 would have been pyruvic acid; in F10 would have been succinamic acid; in F11 would have been succinic acid; and in F12 would have been N-acetyl L-glutamic acid.

In G1 would have been alaninamide; in G2 would have been D-alanine; in G3 would have been L-alanine; in G4 would have been L-alanyl-glycine; in G5 would have been L-asparagine; in G6 would have been L-glutamic acid; in G7 would have been glycyl-L-glutamic acid; in G8 would have been L-pyroglutamic acid; in G9 would have been L-serine; in G10 would have been putrescine; in G11 would have been 2,3-butanediol; and in G12 would have been glycerol.

In H1 would have been adenosine; in H2 would have been 2'-deoxyadenosine; in H3 would have been incsine; in H4 would have been thymidine; in H5 would have been uridine; in H6 would have been adenosine-5'-monophosphate; in H7 would have been thymidine-5'-monophosphate; in H8 would have been uridine-5'-monophosphate; in H9 would have been fructose-6-phosphate; in H10 would have been glucose-1-phosphate; in H11 would have been glucose-6-phosphate; and in H12 would have been D-L-α-glycerol phosphate.

For a particular Biolog System microplate utilized, a series of positive and negative results produces a pattern which is then converted automatically by the Biolog System computer into a "bio-number." That is, the 96-digit "+" and "−" pattern, resulting from the Biolog System reading of the biological activity of the 96 wells of each Biolog System microplate, is converted into an octal code number, also called a "Bio-Number," having 32 digits. When the Biolog System computer finds in its data library file a species having an identical (or slightly different) bio-number, the Biolog System computer assigns the known species name to the organism being investigated. For example, an organism with the "bio-number" of 1700-2006-1003-7552-6567-7774-1140-0010 was identified as Pseudomonas stutzeri by the Biolog computer software.

In this regard, while several different isolates identified had a slightly different "bio-number," the Biolog System computer software characterized them as different strains (i.e. biotypes) of the same species, namely Pseudomonas stutzeri.

Bacterial Identification And Isolation

To characterize more particularly the populations of the bacterial samples collected, colonies were chosen and isolated for identification. While the Biolog Bacterial Identification System was used to identify most of the bacteria, isolates of the Nocardia genus, a type of Actinomycete (which cannot be identified using the Biolog system), were identified by its distinct morphological features.

Using these methods, we were able to identify 60 biotypes of Pseudomonas stutzeri, 6 biotypes of Alcaligenes denitrificans subsp. xylosoxydans, 3 biotypes of Pseudomonas aeruginosa, 3 biotypes of Pseudomonas mendocina, and Pseudomonas fluorescens. These strains are unique because they have the ability to bio-degrade that mixture of compounds, initially ordinarily considered toxic, discussed herein.

Initialization Of The Thermophilic Aerobic Process

To start-up the biological process, it was necessary to seed the aeration tank 32 several times with a bacterial mixture grown from the cultures isolated previously from the aeration tank 32 and bioreactors.

Each bacterial culture was transferred to a test tube containing suitable nutrient broth. These cultures were grown at 41.5° C. for 48 hours. For each seeding operation, a 10-liter to 30-liter quantity of basal enrichment broth containing material from aeration tank 32 as its sole carbon source was prepared. The contents of the nutrient broth test tubes were transferred to a vessel of suitable size, and the contents were aerated and incubated at 41.5° C. for several days. A sample of the mixture was observed by microscopy to ensure that sufficient quantities of bacteria were present. The sample was then rotaplated to check the actual bacterial concentration of the vessel contents. The vessel contents, if suitable, were added to the aeration tank 32.

This inoculation procedure was repeated several times until the bacterial concentration in the aeration tank 32 stabilized at about $1 \times 10^8$ bacteria/mL.

Advantages Of The Invention

The process of this invention thus uses relative effective amounts of certain specific strains of known organisms, to treat aqueous and other liquid streams containing substances ordinarily considered toxic, the result being the de-toxification of such streams.

For example, the biological process disclosed herein is able to treat effectively liquid streams containing not only aniline, benzothiazole, carboxin, lindane, 2-mercaptobenzothiazole, toluene, and various mixtures of these substances, but also various mixtures further including such organic chemicals as nitrosamines, phenolics, anilines, phenylamines, morpholinics, lindanes, alcohols, ketones, and other aliphatic and aromatic compounds, as well as various mixtures of these sorts of organic chemicals.

Moreover, the biological process disclosed herein is able to treat effectively liquid streams not only containing the organic chemicals recited above but also having high to very high organic loadings, as characterized by DOC loadings of up to 700,000 mg/L.

Thus, the biological process disclosed herein is able to treat effectively liquid streams which would otherwise exhibit toxicity characteristics, to e.g. conventional (i.e.

activated sludge) biological treatment. In comparison, the treated effluent of the biological process disclosed herein is de-toxified by our novel process.

Moreover, the novel biological degradation process disclosed herein is able to treat effectively liquid streams characterized by a wide range of dissolved solids content.

The present invention is thus directed to a process for the treatment of industrial aqueous and other liquid streams, characterized by high organic loading, wherein the treated liquid streams must meet the requirements of various current governmental sewage treatment and discharge requirements.

As yet another feature or advantage, the present invention results in the minimization of sludge production, such a result being desirable, as those skilled in the art well know. The minimization of sludge production is believed to be the result of two factors. The first factor is that the generation rate of the progeny bacteria appears to be balanced by the die-off rate of parent bacteria; and the second factor is that the progeny bacteria appear to consume the metabolites of the previous bacterial generation. The benefits (economic and so forth) associated with minimal sludge production will certainly be appreciated by those skilled in the art.

Thus the biological process disclosed herein, because it includes the unique, specific strains mentioned above, is able not only to de-toxify effectively the streams being treated but also able to increase subsequent biodegradation effectivity of any conventional activated sludge system that is in use further downstream.

Our present invention also features an advantageous by-product, namely the production of heat. In particular, heat energy may be recycled, as desired. For example, the biological process disclosed herein is able to produce energy in the range of 20,000 to 30,000 BTU/kg TOC removed.

Finally, the simplicity of our novel biological degradation process as well as its ease of operation are additional advantages of our invention.

DETAILED DESCRIPTION OF THE INVENTION

Our present invention is thus directed to a biological degradation process for efficient treatment of liquid effluent streams which contain substances ordinarily considered toxic. In this regard, such effluent streams are typically of industrial volumetric quantity. To achieve such a result, our novel biological degradation process utilizes biological agents, specifically bred and acclimatized to adapt to this sort of effluent.

Our novel biological degradation process satisfactorily treats the liquid effluent discharge with relative effective amounts of a unique mixture of thermophilic aerobic bacteria. Over time, the initial mixture of thermophilic aerobic bacteria has evolved and acclimatized specifically to de-toxify these sorts of liquid effluent streams, rendering these streams treatable by conventional (i.e. municipal) sewage treatment facilities.

One such waste water stream results from the operation of an industrial chemical plant which produces over 35 million pounds of various products per year, including such products as accelerators and antioxidants for synthetic rubber products, agricultural chemicals such as herbicides, fungicides, and insecticides, as well as specialty chemical products and various chemical intermediates. Liquid effluent streams which result from the manufacture of these products are initially combined in neutralization basin 22 and subsequently passed to aeration tank 32, an above-ground treatment facility, for mechanical aeration and oxidation of organic contaminants.

Besides the aeration tank 32, the industrial waste-water treatment system includes the neutralization-chemicals source 24 (consisting of two 25,000-gallon pH-adjustment tanks), the surge tank 42 (a 375,000-gallon vessel), post-treatment site 48 which includes two (2) upflow granular activated carbon filters 4.5-meters deep (one 1.8 meters in diameter and the other 2.4 meters in diameter), an ultraviolet ("UV") enhanced oxidation system, and final effluent storage facilities (consisting of a 500,000-gallon final effluent equalization tank and a 250,000-gallon final effluent balance tank).

Liquid effluents from various production sites are collected in neutralization basin 22 and transferred to the aeration tank 32.

Concentrated organic liquid effluent streams, characterized by relatively high chemical oxygen demand (COD) and dissolved organic carbon (DOC) levels, are fed directly to the aeration tank 32 following neutralization, through conduit 30. In the aeration tank 32, the organic loading is reduced by at least 60% to 80% in an auto-heated thermophilic aerobic biological process. Phosphoric acid ($H_3PO_4$) is added to the aeration tank 32 in quantities sufficient to meet biological nutrient requirements.

The aeration tank is a 1,000,000-gallon concrete tank having an interior lining of ceramic tile for corrosion protection. The tank's exterior is insulated for temperature maintenance and weather protection. The tank is agitated and aerated by means of a propeller-driven down-flow draft aerator supplied with air or oxygen through designated (i.e. separated) ring manifolds mounted within the draft tube.

Naturally-occurring bacteria were evidenced periodically in the aeration tank during the mechanical oxidation of the tank contents, through inadvertent inoculation from sources within the plant. These biological cultures suffered annihilation, initially, due perhaps to the upsets and changes in system conditions and influent irregularities.

Subsequently, process-control measures were instituted as pre-treatment steps to minimize variability in aeration tank conditions and to keep the aeration tank environment as stable as possible, for the purpose of maintaining viability of the bacterial cultures present in the aeration tank. Inoculation was performed using bacteria-rich mixed liquors from municipal sewage treatment facilities accustomed to industrial effluent.

Conditions in the aeration tank were monitored to maintain an environment conducive to observation and maintenance of the cultures. Simple carbon, from sugar or low molecular weight aliphatic alcohols, was added to the wastewater system to encourage bacterial growth. Dissolved oxygen levels were monitored to ascertain that the respiration of the bacteria was responsible for a Portion of the system's total oxygen consumption.

As the bacterial culture developed and organic contaminants were consumed, microbiological studies were undertaken to identify the population of the culture and count the number of bacteria present. The ongoing analysis throughout the development of the biological process of this invention included recordation of changes in the operating conditions within the aeration tank, in an effort to optimize the efficiency of the biological degradation and consumption of organic contaminants.

As soon as a particular culture was flourishing and optimized by identification of key operating parameters and control of such parameters, the emphasis was directed to the removal of specific contaminants contained within the liquid effluent supplied to the aeration tank. Certain compounds which were known to be present in the existing liquid streams supplied to the aeration tank, such as aniline and lindane, were analyzed in the aeration tank influent and effluent streams. The net reduction of these compounds became our indication of the efficiency of the plant's novel biological water-treatment system.

Concurrent Pilot Plant Operation

Concurrent with the operation of the plant aeration tank, two pilot scale (11-liter) bio-reactors were operated in a laboratory environment. Feeds and operating conditions were maintained and matched to those of the actual plant aeration tank. Once equilibrium was reached, one of the two pilot plant bio-reactors reactors was operated at conditions identical to the plant aeration tank, to serve as a "control," while conditions in the second bio-reactor were altered, to assess the impact of minor process modifications upon the viability of the bacteria. Trace elements as well as vitamin supplements were added, in controlled amounts, to the nutrients available to the bacteria, and the effect upon the bacteria noted.

Aeration tank operating parameters which were controlled and/or otherwise monitored include influent rates, hydraulic retention times, pH of tank contents, the temperature of each tank contents, carbon source feed rates, air/oxygen supply rates, bacterial population, and the removal rate of contaminants.

The novel biological system which developed as a result of years of ongoing process-development and biological culture evolution through this experimentation period has produced a biological culture demonstrating strong resistance to those sorts of toxicity found in liquid effluent streams otherwise associated with conventional organic chemical manufacturing facilities.

In particular, the de-toxification of numerous aqueous and other liquid streams initially ordinarily considered toxic now readily occurs as a result of the biological activity of our novel mixture of specially acclimatized bacterial cultures, namely, the unique thermophilic aerobic bacterial mixture disclosed herein. These cultures, in particular, are readily able to bio-degrade and de-toxify a vast assortment of liquid effluent streams ordinarily resulting from operation of the industrial manufacturing facility, resulting in a lessening of the facility's impact on the environment while providing an inexpensive and environmentally-acceptable manner of disposal of by-products.

Pilot Plant Optimization Study

An identification of the bacteria present in the aeration tank is thus linked to the optimization of operating parameters of the process of this invention. As was mentioned above, two 11-liter pilot-scale bio-reactors were operated simultaneously with the plant reactor to achieve process optimization.

Each bio-reactor unit was initially "loaded" with 6 liters of aeration tank contents and continuously aerated to maintain DO concentration of 2 mg to 4 mg oxygen per liter. Each bio-reactor unit also included heating means for maintaining reactor contents at a constant temperature of 40 degrees Celsius to 42° C. Each bio-reactor unit further included automated DO monitoring and recording equipment, pH monitoring and recording equipment, and temperature monitoring and recording equipment, for the purpose of providing detailed information on system performance.

Also, as was mentioned above, one of the bio-reactor units was designated as a "control" unit, and its operating conditions closely "tracked" those of the plant aeration tank. With respect to the other bio-reactor unit, the amounts of additives (such as trace elements) were varied, to measure their effect on microbial degradation activity.

A calculated volume of the plant influents was added daily to the two bio-reactor units to reflect the feeding regime of full-scale operation. The plant aeration tank mixture contained one part by volume neutralized effluent from carboxin production and seven parts by volume surge tank liquid effluent. The total volume added to the two bio-reactor units was proportional to the volume introduced into the plant aeration tank over a particular period of time. In particular, the influent COD and TOC concentrations, as well as the hydraulic-retention time of the two bio-reactor units were each equal to those of the plant aeration tank.

The microbiological analyses on these tanks, including microscopic analyses, were performed daily. The observations indicated that the plant aeration tank contained a wide variety of bacterial types, some of which are highly mobile, including flagellated protozoans. Such species, which adapted to the high temperature of the tanks, indicate that the toxicity of the plant aeration tank effluent was greatly reduced.

Bacterial Analysis

The microscopic observations carried out as part of this investigation were videotaped using the above-described Nikon Optiphot-2 Phase contrast microscope with an attached Nikon FX 35WA 35 mm camera, Hitachi KP-C503G solid-state color camera, Panasonic PV-4201-K VHS video cassette recorder, and a JVC TM-13CA color monitor.

To accurately count and identify the bacteria present in the samples, a special growth medium was used. The medium was a basal enrichment agar which consisted of ammonium sulfate, calcium chloride, magnesium sulfate, ferric chloride, dipotassium hydrogen phosphate, potassium dihydrogen phosphate, distilled water, noble agar, and a trace element solution. A first mixture ordinarily considered toxic from carboxin production and a second mixture ordinarily considered toxic from the surge tank waste were combined and added to the medium as its sole carbon source. The COD of this mixture was 12,000 mg/liter, and as such approximated typical COD values for the aeration tank effluent.

Samples were analyzed by preparing the appropriate dilution, rotaplating these dilutions onto the growth medium plates and incubating for four days at 41.5° C. This method produced the bacteria counts shown in Table II.

TABLE II

Levels of Bacteria in Aeration Tank and Bioreactors

| Sample Source | Concentration Ranges |
| --- | --- |
| Aeration Tank (41.5° C.) | $1.27 \times 10^7$ per ml. to TNTC |
| Unit #1 | $2.03 \times 10^5$ per ml. to TNTC |
| Unit #2 | $2.75 \times 10^5$ per ml. to TNTC |

Note: TNTC means "too numerous to count."

To identify the types of bacteria present in the aeration tank and the pilot scale reactors, colonies with different morphologies were isolated and purified on Nutrient Gelatin agar. The morphologies of the isolates are presented in Tables III and IV.

TABLE III

Physical And Biological Characteristics Of
Bacterial Isolates From Aeration Tank (Commercial Scale)

| Isolate No. | Morphology |
|---|---|
| J6-1 | 3 mm - creamy, convex, smooth |
| J6-2 | 2.5 mm - creamy, convex, smooth |
| J6-3 | pinpt. - white |
| J6-4 | pinpoint - white |
| J7-1 | 2 mm - creamy, convex, wrinkled edge |
| J7-2 | 1 mm - creamy, flat, smooth |
| J7-3 | ½ mm - white, convex, smooth |
| AT-A | 6 mm - beige, wrinkled surface, spreading |
| AT-B | 2 mm - beige, smooth, convex |
| AT-C | 0.5 mm - white, smooth, flat |
| AT-D | 2.5 mm - creamy, smooth, convex |
| F14-A | 1 mm - white, smooth, convex |

TABLE IV

Physical And Biological Characteristics Of Bacterial Isolates
From Pilot-Scale Bioreactors @ 41.5° C.

| Sample Source | Isolate No. | Morphology |
|---|---|---|
| Unit #1 (41.5° C.) | U1-A | 5 mm - creamy, smooth, convex |
| | U1-B | 0.5 mm - flat, white |
| | U1-C | pinpoint - white |
| Unit #2 (41.5° C.) | U2-A | 3 mm - creamy, convex, smooth |
| | U2-B | 5 mm - creamy, convex, smooth |
| | U2-C | 0.5 mm - white, smooth, convex |
| Unit #1 | F14-B | 2 mm - beige, wrinkled edge |
| | F14-C | 6 mm - beige, clear wrinkled edge |
| | F14-D | 2 mm - creamy, smooth, convex |

Notes:
(1) Gram Stain for each of J6-1, J6-2, J6-3, J6-4, J7-1, J7-2, J7-3, AT-A, AT-B, AT-C, AT-D, U1-A, U1-B, U1-C, U2-A, U2-B, U2-C, F14-A, F14-B, F14-C and F14-D indicated gm-rods.
(2) Catalase for each of J6-3, J6-4, J7-1, J7-3, AT-A, AT-C, AT-D, U1-A, U1-B, U1-C, U2-A, U2-B, U2-C, F14-A, F14-B, F14-C and F14-D indicated +; and Catalase for the remainder indicated −.
(3) Oxidase for each of J6-1, J6-2, J6-3, J6-4, J7-1, J7-2, J7-3, AT-A, AT-B, AT-C, AT-D, U1-A, U1-B, U1-C, U2-A, U2-B, U2-C, F14-A, F14-B, F14-C and F14-D indicated +.
(4) Gelatinase for each named in note (3) indicated −.

Several biochemical tests were performed on the isolates to assist in their identification, presented in Table V.

TABLE V

Bacterial Isolate Identification

| Isolate Number | Identification |
|---|---|
| F14-A | *Alcaligenes denitrificans* |
| F14-B | *Pseudomonas stutzeri* |
| F14-C | *Pseudomonas stutzeri* |
| F14-D | *Pseudomonas stutzeri* |
| F14-E | *Pseudomonas stutzeri* |
| F14-G | *Pseudomonas stutzeri* |
| F28-B | *Achromobacter gr. VD* |
| F28-C | *Pseudomonas alcaligenes* |
| F28-D | *Pseudomonas alcaligenes* |
| F28-F | *Pseudomonas alcaligenes* |

Ten of the isolates were identified as *Pseudomonas stutzeri*, with four different biotypes of this bacteria identified, as well as *Pseudornonas putrefaciens*.

It is well known that *Pseudomonas* species are especially active in the degradation of organic streams, such as are present in the actual industrial stream of the subject operating plant. This is consistent with the type of bacteria that would biodegrade organic compounds typically found in the aeration tank. This is, however, surprising because (as was mentioned above) this particular combination of strains has the ability to bio-degrade not only a mixture of compounds ordinarily considered toxic, but also an assortment of other compositions ordinarily considered toxic.

Biodegradation Rate Assessment

In order to establish specific rates of biodegradation for the components in the actual operating plant streams, surrogate chemicals such as aniline, carboxin, and lindane were used. For this, the bench scale bio-reactors were inoculated with known concentrations of trace amounts of these chemicals and their breakdown was monitored by standard gas chromatography/mass spectroscopy ("GC/MS") techniques.

Biodegradation Rate Optimization

Bacteria require nutritional ingredients including vitamins as well as such elements as organic carbon, nitrogen and phosphorus. The presence of such nutrients can have a marked effect on the rate of metabolism of the bacteria as well as on specific catabolic enzyme activity. As a result, with proper supportive nutrients, desired bio-oxidation of specific organic compounds can occur.

Continued successful operation of the aeration tank and the biological degradation of the streams containing substances ordinarily considered toxic is thus dependent on the continuous, periodic monitoring of these nutrients as well as the overall aeration tank environment.

Analytical Testing And Procedures

Methods using gas chromatography/low resolution mass spectrometry were developed, analytically to determine presence and quantity of N-nitrosodimethylamine (NDMA), lindane, and aniline. NDMA analysis also involves the use of a thermal energy analyzer.

Identification And Quantification Of NDMA In Aqueous Samples

Samples were prepared by filtration, if necessary, and pH adjustment to 10. The basic solution was serially extracted with dichloromethane, washed with an acidic solution, and concentrated. The sample extracts were analyzed by standard GC/MS techniques, using the isotope dilution method and by gas chromatography-thermal energy analyzer using the method of standard addition. The combination of these two techniques served to verify the observed results.

All glassware used in the analysis was either machine-washed or hand-washed and rinsed with de-ionized water. Prior to use in any procedure, glassware was rinsed with HPLC-grade methanol and dichloromethane. (The term "HPLC" means high pressure liquid chromatography.) For water Samples containing substances ordinarily considered toxic, one liter amber bottles with teflon-lined caps were used and the samples stored in the dark at 4° C.

For each batch of samples, a procedure blank consisting of 500 ml HPLC-grade water was prepared and treated as a routine sample. The pH was adjusted to pH 10 by the drop-wise addition of a 50% NaOH solution. The samples were mixed thoroughly and the pH noted.

Water samples containing substances ordinarily considered toxic, if visibly clean, were added to two different separatory funnels of 500-ml each. If the samples were visibly dirty, two 100-ml volumes of water sample (containing substances ordinarily considered toxic) were added to different 1000-ml separatory funnels; then, 400 ml of HPLC-grade water was added to each and the pH measured and adjusted, if necessary. If needed, the sample was filtered through glass wool before the addition of water.

To one of the duplicate samples, an internal standard solution consisting of NDMA with six hydrogen atoms replaced with deuterium (d6-NDMA) was added.

The term "NDMA" means N-nitrosodimethylamine and the term "d6-NDMA" means deuterium-substituted NDMA.

For low concentrations, ten (10) microliters ("µL") of a 40-ppm solution of d6-NDMA in methanol was used, while for more concentrated samples 10 µL of a 400-ppm solution of d6-NDMA in methanol was used. Variations in the size of the "d6" spike used to match more closely the level of NDMA present could be accommodated if the level was known. Both samples were serially extracted with dichloromethane, respectively using 80-ml, 40-ml, and 40-ml portions. The resultant extracts (which included emulsions) were collected in fresh separatory funnels and swirled gently to break any emulsions, if present. Each such extract was then washed with 100 ml of HPLC-grade water adjusted to pH 2 using sulfuric acid ($H_2SO_4$). The dichloromethane fraction (excluding emulsions) was filtered through sodium sulfate ($Na_2SO_4$) into a 250 ml roundbottom flask. About one inch of $Na_2SO_4$ in a glass funnel was washed thoroughly with dichloromethane and then rinsed after filtration with the rinse being added to the sample.

To each final sample of dichloromethane extract collected, 10 µL of either 40 ppm NDPA solution in dichloromethane or 400 ppm NDPA solution in dichloromethane was added as an internal standard to correct for any differences in extract volume occurring during concentration or injection. (The term "NDPA" means N-nitrosodi-n-propylamine.)

For bulk solid based samples, a weighed amount of the sample was subjected to a water/acetone ultrasonioation extraction followed by a liquid:liquid extraction with dichloromethane, as described for the water based samples. The sample extracts were concentrated to between 1.0 and 2.0 ml either by a rotary evaporator or a Kuderna-Danish apparatus and transferred to a 2.0 ml autosampler vial. The flask was rinsed with additional dichloromethane and transferred to the vial.

Clean samples were concentrated to 250 µL under a stream of ultrahigh purity ("UHP") nitrogen. Dirty samples were concentrated to 1.0 ml using the same procedure.

Detection Systems: (GC/MS; GC/TEA)

The GC/MS used was a Hewlett Packard 5890 Gas Chromatograph and 5971 Mass Selective Detector. The capillary column was fused silica, 30 meter long, 0.25 meter I.D., supplied by J&W Scientific DB-17, 0.25 micron film thickness. The sample was injected into the column using a retention gap, 1 meter de-activated fused silica, of 0.25 mm I.D.

The column oven-temperature program was set at 35° C. and held for 3.0 minutes; raised to 60° C. at 10° C./minute; raised to 250° C. at 25° C./minute and held for 10.0 minutes.

The ions monitored by the above method were at mass/charge ratio (m/z) 74 and 42 for NDMA; and m/z 80 and 46 for d6-NDMA. The ratio of NDMA to d6-NDMA was measured, corrected for response factor (signal strength) and recovery (extraction) efficiency.

The GC/TEA detection system consisted of a Hewlett Packard 5890 Gas Chromatograph and a Thermedics TEA Model 602 Nitrogen Analyzer. (The term "TEA" means thermal energy analyzer.) The capillary column, fused silica, was identical to the capillary column (by J&W Scientific) described above, as was the retention gap.

The column oven-temperature program was set at 40° C.; held for 4.0 minutes; raised to 70° C. at 10° C./minute and held for 2.0 minutes; raised to 250° C. at 25° C./minute and held for 10.0 minutes. The ratio of NDMA to NDPA was measured and corrected for response factor (or signal strength) for both samples. Because the GC/TEA analysis did not distinguish between d6-NDMA and NDMA, differences in corrected signals and amount of d6-NDMA were added to correct for extraction efficiency.

Both the GC/MS procedures as well as the GC/TEA procedures employed a calibration standard with a known concentration of NDMA and NDPA. A calibration factor was determined, and measured concentrations from samples were corrected using it.

Quality control of the monitoring procedures included instrument and laboratory quality assurance and control as well as a sample tracking system.

Detection Of Lindane And Aniline In Water And Effluent By GC/MS

The method used to determine these materials was similar to the one described above for NDMA. Samples were prepared by filtration and pH adjusted to 10, as was mentioned above. The basic solution was serially extracted with dichloromethane and then concentrated. The sample extracts were analyzed by GCIMS using a deuterated internal standard method.

For water samples containing substances ordinarily considered toxic, a 10 to 25 ml volume of sample was added to a separatory funnel and diluted to 500 ml with pH 10 water. If necessary, the sample was filtered through glass wool before dilution.

To the diluted sample, the internal standard solution of d10-NDEA (deuterium-substituted N-nitrosodiethylamine) was added. For most water samples containing substances ordinarily considered toxic, 10 µL of a 400 ppm solution was used. Variations in the sizes of the deuterated spikes were used to match more closely the responses for the analytes in the samples, if prior knowledge of the levels were known.

The extracts (including emulsions) were collected in a second separatory funnel and swirled gently. The dichloromethane fraction (excluding emulsions) was filtered through $Na_2SO_4$ and into a 250 ml round bottom flask. The samples were then concentrated to a volume between 1.0 and 2.0 ml by a rotary evaporator and transferred to a 2 ml autosampler vial.

The flask was rinsed with additional dichloromethane and transferred to the vial. The samples were further concentrated to 1.0 ml under a stream of UHP (ultra-high purity) nitrogen.

The GC/MS equipment and column were identical to those described for NDMA analysis. For this analysis, the samples were injected at 200° C., and the column oven temperature program set at 40° C., held for 2.0 minutes, the temperature raised to 300° C. at 8° C./min and held for 10.0 minutes.

The ions monitored in group one were those having mass/charge ratios of 93, 66, 112, and 50. The second group of ions had mass/charge ratios of 181, 219, 254 and 290.

The samples analyzed contained d10-NDEA; and the ratio of analyte to d10-NDEA was measured and reported after correction for response factor and recovery.

Results And Plant Operating Data

Actual operating data over a period of about five (5) years (i.e., during the evolution of the unique thermophilic aerobic bacterial mixture disclosed herein) relating to the effluent feed, the contents of the aeration tank, and the effluent discharged from the system, indicates that the system disclosed herein is capable of reductions in COD, DOC and $BOD_5$ in excess of 80%.

Operating Conditions—pH

The pH of the aeration tank contents ranged between 6.9 and 8.7, which corresponds to an acceptable pH range for the bacteria groups found in the aeration tank. Bench-scale studies provided more information on the correlation between pH and biological activity, with respect to bacterial count and shifts in dominant organism species.

Operating Conditions—Temperature

The temperature of the aeration tank ranged between 35° C. and 42.7° C. The system experienced several process upsets caused by irregular influent rates at critically low organic loadings. Changes to the operation of the biological system (including a substantial increase in organic loadings) allowed the system to recover from these upsets. It is noteworthy that each time there was an upset, a prolonged period of up to two weeks was at times required to bring the system back to steady-state operations. During this recovery period the removal rates improved, the temperature stabilized, and total suspended solids concentration decreased to approximately 500 mg/liter.

Dissolved Oxygen (DO)

The dissolved oxygen concentration in the aeration tank ranged from less than 0.1 milligrams/liter to 8.5 milligrams/liter, with the higher DO values indicating unstable process conditions, which was confirmed by low values of respiration rates (oxygen consumption rates).

As the biological process of this invention stabilized, dissolved oxygen concentrations dropped to the range of 1.0 to 3.0 mg $O_2$/liter, and the respiration rates stabilized to the range of 0.3 to 0.5 mg $O_2$/liter.

Respiration Rate (RR)

The respiration rates ranged between 0.078 to 0.5 milligrams of $O_2$/liter/minute, averaging 0.248 mg $O_2$/L/min. to 0.35 mg $O_2$/L/min. At times, $O_2$ demand exceeded supply, affecting the rate of co-metabolism.

Conclusions/Summary

The above comments and operating data indicate conclusively the clearly unexpected (i.e. pleasantly surprising) and successful outcome of the process of this invention. In particular, toxic waste water (that could not otherwise be processed by conventional activated sludge processes), was easily and safely neutralized by acclimatized bacteria in an aerobic, thermophilic process that produces less than 0.03 kilogram sludge per kilogram of COD removed.

Reference To Patent Deposit

Mixed bacteria (*Pseudomonas stutzeri* #5, 9, 10, 11, 55, 68, 71, 84, 90, 93, 105, 107, 117, 145, 222; *P. mendocina* #64; *P. aeruginosa* #229; *Pseudomonas fluorescens A* #25; *Alcaligenes denitrificans/plechaudii* #25) were assigned American Type Culture Collection (12301 Parklawn Drive, Rockville, Md. 20852 USA) Patent Depository Number ATCC 55793 on Jun. 17, 1996.

Disclosed And Described Herein

What has been described herein is a biodegration process for de-toxifying liquid streams. While our invention has been described with reference to preferred embodiments, it is to be understood that the scope of our invention is not to be limited to these embodiments. On the contrary, alternatives, changes and/or modifications will readily become apparent to those skilled in the art upon reading our foregoing detailed description. Accordingly, such alternatives, changes and modifications are to be understood as forming a part of our invention insofar as such fall within the spirit and scope of the accompanying claims.

What is claimed is:

1. A biological degradation process for treating a liquid stream containing substances ordinarily considered toxic, the process comprising:

contacting the stream with a thermophilic aerobic bacterial mixture wherein the bacterial mixture comprises relative effective amounts of *Pseudomonas stutzeri*, *Pseudomonas aeruginosa*, *Pseudomonas fluorescens*, *Pseudomonas mendocina* and *Alcaligenes denitrificans* subsp. xylosoxydans, for an amount of time that is effective for de-toxifying the stream.

2. The process of claim 1 wherein the substances ordinarily considered toxic are selected from the group consisting of: aniline; benzothiazole; 5,6-dihydro-2-methyl-N-phenyl-1,4-oxathiin-3-carboxamide; $1\alpha,2\alpha,3\beta,4\alpha,5\alpha,6\beta$-hexachlorocyclohexane; 2-mercaptobenzothiazole; toluene; and combinations thereof.

3. The process of claim 1 wherein the substances ordinarily considered toxic are selected from the group consisting of: aniline; benzothiazole; 5,6-dihydro-2-methyl-N-phenyl-1,4-oxathiin-3-carboxamide; $1\alpha,2\alpha,3\beta,4\alpha,5\alpha,6\beta$-hexachlorocyclohexane; 2-mercaptobenzothiazole; toluene; organic chemicals including such aliphatic and aromatic compounds as nitrosamines, phenolics, anilines, phenylamines, morpholinics, lindanes, alcohols, ketones; and combinations thereof.

4. A biological degradation process for treating a liquid stream containing substances ordinarily considered toxic, the process comprising:

contacting the stream with a thermophilic aerobic bacterial mixture wherein the bacterial mixture comprises relative effective amounts of 60 biotypes of *Pseudomonas stutzeri*, 6 biotypes of *Alcaligenes denitrificans* subsp. xylosoxydans, 3 biotypes of *Pseudomonas aeruginosa*, 3 biotypes of *Pseudomonas mendocina*, and *Pseudomonas fluorescens*, for an amount of time that is effective for de-toxifying the stream.

5. The process of claim 4 wherein the substances ordinarily considered toxic are selected from the group consisting of: aniline; benzothiazole; 5,6-dihydro-2-methyl-N-phenyl-1,4-oxathiin-3-carboxamide; $1\alpha,2\alpha,3\beta,4\alpha,5\alpha,6\beta$-hexachlorocyclohexane; 2-mercaptobenzothiazole; toluene; and combinations thereof.

6. The process of claim 4 wherein the substances ordinarily considered toxic are selected from the group consisting of: aniline; benzothiazole; 5,6-dihydro-2-methyl-N-phenyl-1,4-oxathiin-3-carboxamide; $1\alpha,2\alpha,3\beta,4\alpha,5\alpha,6\beta$-hexachlorocyclohexane; 2-mercaptobenzothiazole; toluene; organic chemicals including such aliphatic and aromatic compounds as nitrosamines, phenolics, anilines, phenylamines, morpholinics, lindanes, alcohols, ketones; and combinations thereof.

7. The process of claim 6 wherein the liquid stream is further characterized by DOC loadings of up to 700,000 mg/liter.

* * * * *